UNITED STATES PATENT OFFICE.

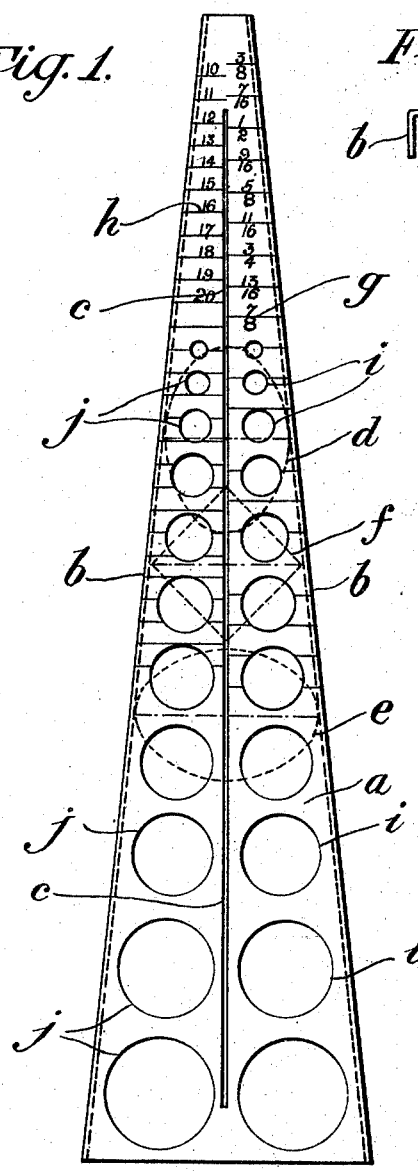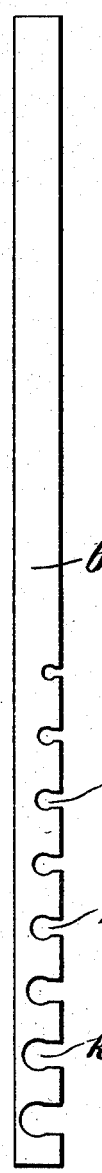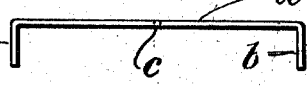

GEORGE WALLACE, OF HIGH HOLBORN, LONDON, ENGLAND.

MEASURING AND MARKING GAGE.

1,275,802.   Specification of Letters Patent.   Patented Aug. 13, 1918.

Application filed April 18, 1918. Serial No. 229,426.

*To all whom it may concern:*

Be it known that I, GEORGE WALLACE, a subject of His Majesty the King of England, and resident of High Holborn, in the county of London, Kingdom of England, have invented certain new and useful Improvements in Measuring and Marking Gages, of which the following is a specification.

This invention relates to improvements in measuring and marking gages.

The invention has for its object to provide means whereby metal or other rods or the like may be accurately centered for lathe or machining purposes.

A further object is to provide a device whereby the diameters or sizes of round or other shaped rods may be readily and accurately ascertained.

The invention will now be described with reference to the accompanying drawings in which:—

Figure 1 is a plan of one form of gage constructed according to this invention;

Figs. 2 and 3 are end views thereof, and

Fig. 4 is a side view of the gage shown in Fig. 1 but including a wire gage.

As shown the gage is constructed from a piece of sheet metal $a$ such as steel or other suitable material of taper form. The longitudinal edge $b$ on each side of the piece $a$ is bent at right angles to the plane surface of the gage. The gage tapers down from the diameter or size of the largest rod, bar or other material to be marked or measured to the diameter or size of the smallest. A slot $c$ is cut longitudinally and centrally from a short distance from the wide end of the gage to within a short distance from the narrow end.

In operation, the rod or bar to be marked or measured is placed in a vise or other holding device and the gage $a$ is placed over the end of the bar with the bent edges $b$ downward and moved along until the sides of the rod or bar touch the two bent edges $b$ of the gage $a$. A scriber or like pointed instrument is then placed in the slot $c$ in the gage and drawn along and across the end of the rod or bar. Thus a center mark is made. The gage is then turned at right-angles to its previous position and the rod or bar is again scribed in a similar manner. The intersection of the two marks is obviously the center of the said rod. Any shaped section of material may be centered by the above described gage such as round, square, oval, octagonal, hexagonal or oblong rod and it is obvious that several scribing lines may be placed on the material to more accurately obtain the center. In Fig. 1 the dotted lines $d$ indicate a piece of material of approximately oval section positioned for marking a central longitudinal line and the dotted lines $e$ indicate the same piece positioned for marking a transverse central line. The dotted lines $f$ indicate a piece of material of approximately square section positioned for marking a central line from corner to corner. In each of the said views $d$, $e$ and $f$ a dot and dash line is drawn showing the marking of each piece of material in its first position.

The gage $a$ may be scribed or otherwise marked on one side of the central slot $c$ to indicate inches and subdivision thereof as shown at $g$ and the other side of the slot $c$ may be likewise scribed to indicate millimeters as shown at $h$. These markings $g$ and $h$ on the upper side of the gage $a$ correspond with the distance on the underside between the two downwardly bent sides $b$ thereof, thus showing at a glance the diameter or width of the bar or rod being centered. Extreme accuracy in measurement may thus be obtained, owing to the fact that the gage is tapered, and the divisions being marked along its length, the said divisions are much wider apart than would be the case with an ordinary gage or rule and therefore more easily read. The graduations for square and round sections may be such that the reading at the point of outline showing in the slot toward the upper or small end may be the diameter across the center of the section. For other sections the graduations should be such as to be read correctly at the center of the section when it has been marked.

Holes $i$ may be drilled along the gage between the slots $c$ and the turned down sides $b$ for the clearing sizes of drills and other holes $j$ may be drilled for the tapping sizes of drills. The two side edges $b$ may be slotted along their length as shown at K in Fig. 4 so that the gage can also be used as a metal gage.

What I claim is:

1. A center marking gage comprising a tapered trough provided with a central scribing slot.

2. A measuring and center marking gage comprising a tapered trough provided with a longitudinal scribing slot and having markings on its upper surface to show the size of the trough at the corresponding part of the undersurface of the gage.

3. A measuring and center marking gage comprising a plate bent over along its longitudinal edges to provide a tapered trough, said plate having a longitudinally and centrally disposed slot and a plurality of holes cut in said plate.

4. A measuring and center marking gage comprising a plate bent over along its longitudinal edges, said longitudinal edges having a plurality of slotted holes cut therein.

5. A measuring and center marking gage comprising a tapered trough shaped plate having a longitudinal and centrally disposed slot cut therein, the body of said plate having a plurality of holes, and the upper surface of said plate having markings thereon to show the size of the trough at the corresponding part of the under surface of the gage.

6. A measuring and center marking gage comprising a plate bent to provide a trough tapered along its length, said plate having a longitudinally and centrally disposed slot cut therein and a plurality of holes, the upper surface of said plate having markings thereon to show the size of the trough at the corresponding part of the undersurface of the gage.

7. A measuring and center marking gage comprising a tapered plate bent over along its longitudinal edges to provide a tapered trough, said plate having a longitudinal and central slot cut therein, the upper surface of said plate having a series of markings thereon to show the size of the trough at the corresponding part of the under surface of the gage, and the body of the plate also having a plurality of holes therein between the said slot and the longitudinal edges thereof.

In testimony whereof I have hereunto signed my name.

GEORGE WALLACE.

Copies of this patent may be obtained for five cents each, by addressing the "Commissioner of Patents, Washington, D. C."